(12) United States Patent
Rabinovich et al.

(10) Patent No.: US 10,963,758 B2
(45) Date of Patent: Mar. 30, 2021

(54) STRUCTURE LEARNING IN CONVOLUTIONAL NEURAL NETWORKS

(71) Applicant: MAGIC LEAP, INC., Plantation, FL (US)

(72) Inventors: Andrew Rabinovich, San Francisco, CA (US); Vijay Badrinarayanan, Mountain View, CA (US); Daniel Detone, San Francisco, CA (US); Srivignesh Rajendran, Mountain View, CA (US); Douglas Bertram Lee, Redwood City, CA (US); Tomasz Malisiewicz, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 16 days.

(21) Appl. No.: 16/366,047

(22) Filed: Mar. 27, 2019

(65) Prior Publication Data
US 2019/0286951 A1    Sep. 19, 2019

Related U.S. Application Data

(63) Continuation of application No. 15/457,990, filed on Mar. 13, 2017, now Pat. No. 10,255,529.

(Continued)

(51) Int. Cl.
*G06K 9/00* (2006.01)
*G06K 9/66* (2006.01)
(Continued)

(52) U.S. Cl.
CPC .............. *G06K 9/66* (2013.01); *G06K 9/4628* (2013.01); *G06K 9/6267* (2013.01);
(Continued)

(58) Field of Classification Search
None
See application file for complete search history.

(56) References Cited

U.S. PATENT DOCUMENTS

| 5,111,516 A | 5/1992 | Nakano et al. |
| 5,291,560 A | 3/1994 | Daugman |
(Continued)

FOREIGN PATENT DOCUMENTS

| EP | 1650711 | 4/2006 |
| JP | 2013-250856 | 12/2013 |
(Continued)

OTHER PUBLICATIONS

Demjen, E., et al., "Eye Tracking Using Artificial Neural Networks for Human Computer Interaction," Institute of Experimental Physics, Slovakia, dated Aug. 1, 2011 (4 pages).
(Continued)

*Primary Examiner* — Hadi Akhavannik
(74) *Attorney, Agent, or Firm* — Vista IP Law Group, LLP

(57) ABSTRACT

The present disclosure provides an improved approach to implement structure learning of neural networks by exploiting correlations in the data/problem the networks aim to solve. A greedy approach is described that finds bottlenecks of information gain from the bottom convolutional layers all the way to the fully connected layers. Rather than simply making the architecture deeper, additional computation and capacitance is only added where it is required.

21 Claims, 16 Drawing Sheets

Related U.S. Application Data

(60) Provisional application No. 62/307,071, filed on Mar. 11, 2016.

(51) Int. Cl.
  *G06K 9/62* (2006.01)
  *G06K 9/46* (2006.01)
  *G06N 3/04* (2006.01)
  *G06N 3/08* (2006.01)

(52) U.S. Cl.
  CPC ......... *G06K 9/6272* (2013.01); *G06N 3/0454* (2013.01); *G06N 3/082* (2013.01)

(56) References Cited

U.S. PATENT DOCUMENTS

| | | | |
|---|---|---|---|
| 5,511,134 | A | 4/1996 | Kuratomi et al. |
| 5,572,596 | A | 11/1996 | Wildes et al. |
| 5,751,286 | A | 5/1998 | Barber et al. |
| 5,850,470 | A | 12/1998 | Kung et al. |
| 6,018,728 | A | 1/2000 | Spence et al. |
| 6,035,057 | A | 3/2000 | Hoffman |
| 6,121,953 | A | 9/2000 | Walker |
| 6,138,109 | A | 10/2000 | Grichnik et al. |
| 6,768,509 | B1 | 7/2004 | Bradski et al. |
| 6,865,302 | B2 | 3/2005 | Chang |
| 7,016,532 | B2 | 3/2006 | Boncyk et al. |
| 7,324,669 | B2 | 1/2008 | Nakanishi et al. |
| 7,379,563 | B2 | 5/2008 | Shamaie |
| 7,603,000 | B2 | 10/2009 | Zheng et al. |
| 7,644,049 | B2 | 1/2010 | Bradski |
| 7,689,008 | B2 | 3/2010 | Hammoud et al. |
| 8,031,948 | B2 | 10/2011 | Liu et al. |
| 8,131,011 | B2 | 3/2012 | Nevatia et al. |
| 8,180,112 | B2 | 5/2012 | Kurtz et al. |
| 8,369,595 | B1 | 2/2013 | Derakhshani et al. |
| 8,374,404 | B2 | 2/2013 | Williams et al. |
| 8,392,484 | B2 | 3/2013 | Zhou et al. |
| 8,411,910 | B2 | 4/2013 | Savvides et al. |
| 8,472,120 | B2 | 6/2013 | Border et al. |
| 8,488,888 | B2 | 7/2013 | Balan et al. |
| 8,553,989 | B1 | 10/2013 | Owechko et al. |
| 8,767,016 | B2 | 7/2014 | Yang |
| 8,873,812 | B2 | 10/2014 | Larlus-Larrondo et al. |
| 8,890,813 | B2 | 11/2014 | Minnen |
| 8,963,806 | B1 | 2/2015 | Starner et al. |
| 8,965,822 | B2 | 2/2015 | Frank et al. |
| 9,147,125 | B2 | 9/2015 | Wang et al. |
| 9,224,068 | B1 | 12/2015 | Ranzato |
| 9,317,785 | B1 | 4/2016 | Moon et al. |
| 9,501,498 | B2 | 11/2016 | Wnuk et al. |
| 9,542,626 | B2 | 1/2017 | Martinson et al. |
| 9,600,069 | B2 | 3/2017 | Publicover et al. |
| 9,721,150 | B2 | 8/2017 | Gottemukkula et al. |
| 9,767,615 | B2 | 9/2017 | Young et al. |
| 9,791,700 | B2 | 10/2017 | Schowengerdt |
| 9,811,730 | B2 | 11/2017 | Komogortsev |
| 9,911,219 | B2 | 3/2018 | Fleishman et al. |
| 1,025,552 | A1 | 4/2019 | Rabinovich et al. |
| 1,027,590 | A1 | 4/2019 | Bradski |
| 2002/0102024 | A1 | 8/2002 | Jones et al. |
| 2002/0159627 | A1 | 10/2002 | Schneiderman et al. |
| 2005/0100209 | A1* | 5/2005 | Lewis ............... G06K 9/6262 |
| | | | 382/159 |
| 2006/0008151 | A1 | 1/2006 | Lin et al. |
| 2006/0291697 | A1 | 12/2006 | Luo |
| 2007/0022329 | A1 | 1/2007 | Adamek et al. |
| 2007/0036397 | A1 | 2/2007 | Hamza |
| 2008/0187227 | A1 | 8/2008 | Bober et al. |
| 2009/0185723 | A1 | 7/2009 | Kurtz et al. |
| 2010/0002913 | A1 | 1/2010 | Hamza |
| 2010/0014718 | A1 | 1/2010 | Savvides et al. |
| 2010/0177929 | A1 | 7/2010 | Kurtz et al. |
| 2011/0194738 | A1 | 8/2011 | Choi et al. |
| 2011/0286628 | A1 | 11/2011 | Goncalves |
| 2011/0317917 | A1 | 12/2011 | Free |
| 2012/0121193 | A1 | 5/2012 | Lipson et al. |
| 2013/0076943 | A1 | 3/2013 | Yoon et al. |
| 2013/0336547 | A1 | 12/2013 | Komogortsev |
| 2013/0346168 | A1 | 12/2013 | Zhou et al. |
| 2014/0037152 | A1 | 2/2014 | Tan et al. |
| 2014/0055488 | A1 | 2/2014 | Masters et al. |
| 2014/0171756 | A1 | 6/2014 | Waldorf et al. |
| 2014/0270361 | A1 | 9/2014 | Amma |
| 2015/0009124 | A1 | 1/2015 | Antoniac |
| 2015/0016712 | A1 | 1/2015 | Rhoads et al. |
| 2015/0036922 | A1* | 2/2015 | El Dokor ............ G06K 9/4661 |
| | | | 382/159 |
| 2015/0051840 | A1* | 2/2015 | Vervier ............. G06K 9/00147 |
| | | | 702/19 |
| 2015/0117760 | A1 | 4/2015 | Wang et al. |
| 2015/0139535 | A1 | 5/2015 | Siddiqui |
| 2015/0186708 | A1 | 7/2015 | Katz |
| 2015/0205126 | A1 | 7/2015 | Schowengerdt |
| 2015/0261803 | A1 | 9/2015 | Song et al. |
| 2015/0278642 | A1 | 10/2015 | Chertok et al. |
| 2015/0296135 | A1 | 10/2015 | Wacquant et al. |
| 2015/0301797 | A1 | 10/2015 | Miller |
| 2015/0302027 | A1 | 10/2015 | Wnuk et al. |
| 2015/0302250 | A1* | 10/2015 | Miller ................ G02B 27/0093 |
| | | | 382/203 |
| 2015/0324998 | A1 | 11/2015 | Song et al. |
| 2015/0332513 | A1 | 11/2015 | Scavezze et al. |
| 2015/0346495 | A1 | 12/2015 | Welch et al. |
| 2016/0104058 | A1 | 4/2016 | He et al. |
| 2016/0140383 | A1 | 5/2016 | Kim et al. |
| 2016/0189413 | A1 | 6/2016 | Houjou et al. |
| 2016/0335512 | A1 | 11/2016 | Bradski |
| 2016/0358070 | A1* | 12/2016 | Brothers ............. G06N 3/0454 |
| 2017/0175172 | A1* | 6/2017 | Apte .................... G16B 35/00 |
| 2017/0262737 | A1 | 9/2017 | Rabinovich |
| 2017/0293736 | A1* | 10/2017 | Kramer .................. G06F 19/00 |
| 2018/0018451 | A1 | 1/2018 | Spizhevoy et al. |
| 2018/0018553 | A1 | 1/2018 | Bach et al. |
| 2018/0024726 | A1 | 1/2018 | Hviding |
| 2018/0129870 | A1 | 5/2018 | Bacivarov et al. |
| 2018/0137335 | A1 | 5/2018 | Kim et al. |
| 2019/0213751 | A1 | 7/2019 | Bradski |

FOREIGN PATENT DOCUMENTS

| | | |
|---|---|---|
| WO | WO 2005022343 | 3/2005 |
| WO | WO 14/158345 | 10/2014 |
| WO | WO 2016/183020 | 11/2016 |

OTHER PUBLICATIONS

PCT International Search Report and Written Opinion for International Appln. No. PCT/US2016/031499, Applicant Magic Leap, Inc., Forms PCT/ISA/210, 220, and 237, dated Aug. 5, 2016 (14 pages).

PCT International Search Report and Written Opinion for International Appln. No. PCT/US17/22206, Applicant Magic Leap, Inc., forms PCT/ISA/210, 220, and 237, dated May 25, 2017 (8 pages).

Feng, J., et al., "Learning the structure of deep convolutional networks," Department of EECS and ICSI, UC Berkeley, dated 2015 (9 pages).

Response to Non-final office action filed May 21, 2018 for U.S. Appl. No. 15/457,990.

Extended European Search Report for EP Appln. No. 16793329.0, dated May 29, 2018.

Final Office Action for U.S. Appl. No. 15/457,990, dated Jun. 25, 2018.

Non-Final Office Action for U.S. Appl. No. 15/150,042, dated Sep. 12, 2018.

RCE and Response to Final Office Action filed Sep. 25, 2018 for U.S. Appl. No. 15/457,990.

Response to Office Action filed Dec. 12, 2018 for U.S. Appl. No. 15/150,142.

Notice of Allowance dated Nov. 29, 2018 for U.S. Appl. No. 15/457,990.

(56) References Cited

OTHER PUBLICATIONS

Response to European Search Report filed Dec. 24, 2018 for EP Appln. No. 16793329.0.
Notice of Allowance dated Jan. 18, 2019 for U.S. Appl. No. 15/150,492.
Extended European Search Report for EP Appln. No. 17764297.2, dated Feb. 26, 2019.
Non-Final Office Action dated Apr. 18, 2019 for U.S. Appl. No. 16/351,912.
Office Action dated Jun. 23, 2019, for Israeli Patent Appln. No. 255234, with English translation, 18 pages.
Response to Office Action filed Aug. 15, 2019 for U.S. Appl. No. 16/351,912.
Response to Extended European Search Report for EP Appln. No. 17764297.2, filed Sep. 17, 2019.
Final Office Action dated Nov. 15, 2019 for U.S. Appl. No. 16/351,912.
Response to Final Office Action dated Nov. 15, 2019 for U.S. Appl. No. 16/351,912.
Examination Report for Australian Appln. No. 2016261487, dated Nov. 28, 2019 (4 pages).
Examination Report for New Zealand Appln. No. 736574, dated Jan. 31, 2020 (3 pages).
Response to Examination Report for Australian Appln. No. 2016261487, filed Feb. 5, 2020 (14 pages).
Foreign Office Action for IL Patent Appln. No. 261245 dated May 4, 2020.
Foreign Notice of Acceptance for IL Patent Appln. No. 255234 dated Jul. 2, 2020.
Foreign Office Action for JP Patent Appln. No. 2017-558715 dated Jul. 2, 2020.
3rd Exam Report for AU Patent Appln. No. 2016261487 dated Jul. 1, 2020.
Response to 2nd Exam for AU Patent Appln. No. 2016261487 dated Jun. 9, 2020.
Foreign Office Action for KR Patent Appln. No. 10-2018-7029132 dated Jul. 23, 2020.
Foreign Response to Examiner's Report for NZ Patent Appln. No. 736574 dated Jul. 28, 2020.
Foreign Office Action for JP Patent Appln. No. 2018-547429 dated Jul. 21, 2020.
2nd Examination Report for NZ Patent Appln. No. 736574 dated Aug. 24, 2020.
3rd Examination Report for AU Patent Appln. No. 2016261487 dated Aug. 26, 2020.
Foreign OA Response for IP Patent Appln. No. 261245 dated Sep. 6, 2020.
Foreign Examination Report for AU Patent Appln. No. 2016261487 dated Sep. 16, 2020.
Foreign Notice of Acceptance for IL Patent Appln. No. 261245 dated Sep. 15, 2020.
Foreign Response for KR Patent Appln. No. 10-2018-7029132 dated September 23, 2020.
Foreign Response for JP Patent Appln. No. 2017-558715 dated Sep. 25, 2020.
Foreign 4th Examiner's Response for AU Patent Appln. No. 2016261487 dated Sep. 28, 2020.
1st Examination Report for EP Patent Appln. No. 16793329.0 dated Sep. 30, 2020.
Foreign OA Response for JP Patent Appln. No. 2018-547429 dated Oct. 13, 2020.
Foreign 1st Exam Report for AU Patent Appln. No. 2017230184 dated Oct. 13, 2020.
Foreign OA for JP Patent Appln. No. 2017-558715 dated Oct. 20, 2020.
Foreign OA for JP Patent Appln. No. 2018-547429 dated Nov. 4, 2020.
Foreign NOA for KR Patent Appln. No. 10-2018-7029132 dated Nov. 27, 2020.
Foreign Response for NZ Patent Application No. 736574 dated Dec. 23, 2020.
Foreign Response for EP Patent Appln. No. 16793329.0 dated Feb. 3, 2021.

\* cited by examiner

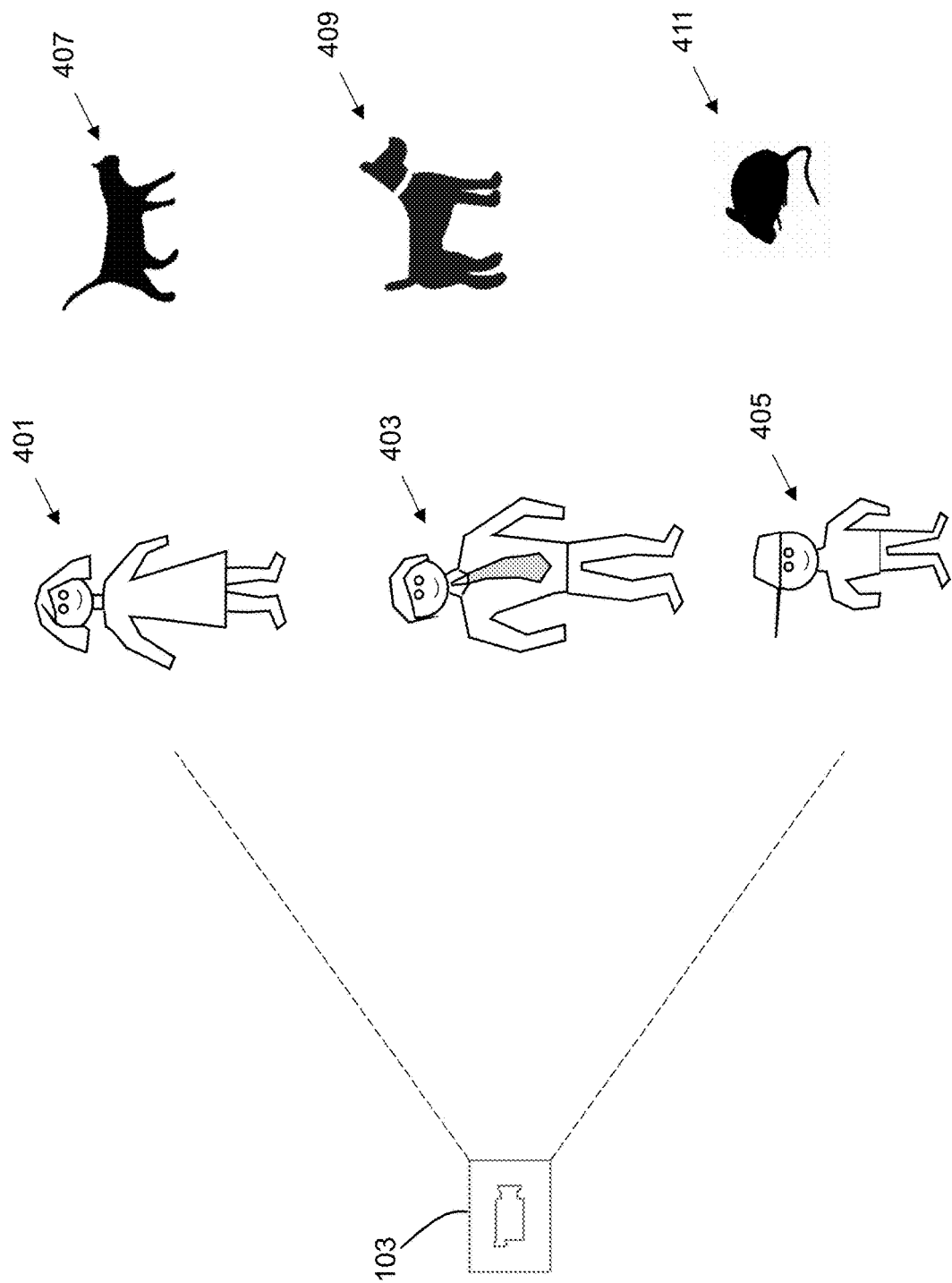

STRUCTURE LEARNING IN CONVOLUTIONAL NEURAL NETWORKS

CROSS-REFERENCE TO RELATED APPLICATION(S)

This application is a continuation of U.S. patent application Ser. No. 15/457,990 filed on Mar. 13, 2017 entitled "STRUCTURE LEARNING IN CONVOLUTIONAL NEURAL NETWORKS" which claims priority to U.S. Provisional Application Ser. No. 62/307,071, filed on Mar. 11, 2016 entitled "STRUCTURE LEARNING IN CONVOLUTIONAL NEURAL NETWORKS". The contents of the aforementioned patent applications are hereby expressly and fully incorporated by reference in their entirety, as though set forth in full.

FIELD OF THE INVENTION

This disclosure pertains to computing networks, and more particularly to neural networks configured to learn hierarchical representations from data.

BACKGROUND

Neural networks pertain to computational approaches that are loosely modeled after the neural structures of biological brain processing that can be used for solving complex computational problems. Neural networks are normally organized as a set of layers, where each layer includes a set of interconnected nodes that include various functions. Weighted connections implement functions that are processed within the network to perform various analytical operations. Learning processes may be employed to construct and modify the networks and the associated weights for the connectors within the network. By modifying the connector weights, this permits the network to learn over time from past analysis to improve future analysis results.

Neural networks may be employed to perform any appropriate type of data analysis, but is particularly suitable to be applied to complex analysis tasks such as pattern analysis and classification. Direct application of these techniques are therefore suitable, for example, to implement machine vision functions such as recognition and classification of specific objects and object classes from image data captured by digital imaging devices.

There are numerous types of neural networks that are known in the art. Deep neural networks is a type of neural network where deep learning techniques are applied to implement a cascade of many layers of nonlinear processing to perform analytical functions. Deep learning algorithms transform their inputs through more layers than shallow learning algorithms. At each layer, the signal is transformed by a processing unit, such as an artificial neuron, whose parameters are learned through training.

A convolutional neural network is a type of neural network where the connectivity pattern in the network is inspired by biological visual cortex functioning. Visual fields are constructed through the network, where the response of an individual artificial neuron to an input stimulus can be approximated mathematically by a convolution operation.

Convolutional deep neural networks have been implemented in the known art. LeNet (LeCun et al. (1998), AlexNet (Krizhevsky et al. (2012), GoogLeNet (Szegedy et al. (2015), and VGGNet (Simonyan & Zisserman (2015) are all examples of ConvNet architectures that implement different types of deep neural networks. These models are quite different (e.g., different depth, width, and activation functions). However, these models are all the same in one key respect—each one is a hand designed structure which embodies the architects' insights about the problem at hand.

These networks follow a relatively straightforward recipe, starting with a convolutional layer that learns low-level features resembling Gabor filters or some representations thereof. The later layers encode higher-level features such as object parts (parts of faces, cars, and so on). Finally, at the top, there is a layer that returns a probability distribution over classes. While there approach provide some structure, in the label space, to the output that is produced by a trained network, the issue is that this structure is seldom utilized when these networks are designed and trained.

Structure learning in probabilistic graphical models have been suggested, where the conventional algorithms for structure learning in deep convolutional networks typically fall into one of two categories: those that make the nets smaller, and those that make the nets better. One suggested approach focuses on taking unwieldy pretrained networks and squeezing them into networks with a smaller memory footprint, thus requiring fewer computational resources. This class of techniques follows the "teacher-student" paradigm where the goals is to create a student network which mimics the teacher. This means that one needs to start with both an Oracle architecture and its learned weights—training the student only happens later. When distilling an ensemble of specialists on very large datasets, the computationally expensive ensemble training step must be performed first.

Feng et al, "Learning the Structure of Deep Convolutional Networks" is an example of a technique for automatically learning aspects of the structure of a deep model. This approach uses an Indian Buffet Process to propose a new convolutional neural network model to identify a structure, where after the structure is determined, pruning is performed to create a more compact representation of the network. However, one drawback with this approach is that the number of layers remain static, where it is only the known individual layers within the static number of layers that is augmented to be more or less complex through the structure learning process. As such, this approach is unable to identify any new layers that may be needed to optimize the structure.

Therefore, there is a need for an improved approach to implement structure learning for convolutional neural networks.

SUMMARY

Some embodiments of the invention are directed to an improved approach to implement structure learning for neural networks. The approach starts out with a network, provides the network with a problem having labeled data, and then reviews the structure of the output produced by this network. The network's architecture is then modified to obtain a better solution for the specific problem. Rather than having experts come up with highly complicated and domain-specific network architectures, this approach allows the data to drive the architecture of the network that will be used for a specific task.

According to some embodiments, a neural network can be improved by (a) identifying the information gain bottleneck in its structure, (b) applying the structure of the predictions to alleviate the bottleneck, and finally (c) determining the depth of specialists pathways.

Some embodiments implement structure learning of neural networks by exploiting correlations in the data/problem the networks aim to solve, where a greedy approach is performed to find bottlenecks of information gain from the bottom convolutional layers all the way to the fully connected layers. In some embodiments, a network is created at an initial point in time, and a set of outputs are generated from the network when applied to a designated task, e.g., to perform image recognition/object classification tasks. Next, the various layers within the network model are analyzed to identify the lowest performing layer within the model. Additional structures are then injected into the model to improve the performance of the model. In particular, new specialist layers are inserted into the model at the identified vertical position to augment the performance of the model. Rather than just having one general purpose pathway to perform classification for multiple types of objects, a first new specialist layer may be added just to address classification of a first type of object and a second new specialist layer may be added just to address classification of a second type of object. By taking this action, over time, each of these specialist components becomes highly knowledgeable about its dedicated area of expertise, since the specialist is forced to learn extensive levels of detail about the specific subdomain assigned to that specialist component. In this way, the model is improved by adding new layers that will directly address areas of classification that have been specifically identified as being sub-optimal compared to other parts of the network. This same process continues through the rest of the model to identify any additional layers that should be modified and/or augmented.

In certain embodiments, a "loss" mechanism (e.g., a loss layer, a loss function, and/or cost function) is included at each layer of the network. Instead of just having a single top-level loss layer, additional loss layers are added to the other layer within the network, e.g., where a deep neural network has multiple loss layers at intermediate, and final, stages of feature extraction, where each loss layer measures the performance of the network up to that point in depth. Predictions can be generated at each loss layer and converted to the respective confusion matrice, forming a tensor T containing all confusion matrices for the network. By analyzing the structure of T and its elements, the aim is to modify and augment the existing structure of the network both in terms of depth and breadth. To maximize feature sharing and reduce computation on one hand, yet to increase accuracy on the other, the aim is to restructure the existing networks' structure. To do so, the approach partitions the networks' depth as well and breadth according its current performance. Therefore, vertical splitting is performed in some embodiments, e.g., by computing the dot product between the different layers. To partition the architecture in depth, some embodiments compare the neighboring subspaces that correspond to the consecutive loss function evaluations at neighboring layers. In addition, horizontal splitting is performed, e.g., by performing K-way Bifurcation. To improve the performance of the network at a particular layer, its structure (e.g., fully convolutional), may require augmentation. Parts of the network focus on general knowledge (generalist), while others concentrate on a small subset of labels that have high similarity among each other (specialist). Knowledge achieved by layer i will be used to perform the first horizontal partitioning of the network. The processing continues (e.g., in a recursive manner) until the top of the network is reached. At this point, the final model is stored into a computer readable medium.

Some embodiments pertain to the deep learning of the specialists. While the structure of the generalist is known to perform well on general knowledge, it is not guaranteed that this same structure will perform well in a specialist where the task of the specialist may require a more simple or complex representation. Some embodiments allow the structure of each specialist to deviate from the structure of the generalist via depth-wise splitting, in a data-driven manner.

Additional variations of these techniques may be applied in alternate embodiments. For example, for every pair of splits (vertical or horizontal), a network can be retrained to get classification at a given pathway. Techniques can be applied in certain embodiments for speeding this up and/or avoiding it at all, such as by agglomerative clustering and/or splitting. Further, given confusion matrix $C_i$, and its partitioning K, agglomerative clustering may be performed on each of the K parts of the $C_i$ to estimate further splits. This leads to the cost $X_u$. Cost $X_s$ is the cost of supervised grouping, learning new confusion matrices at high levels of the network. $X_u$ is less than or equal to $X_s$+Tau, where Tau is the upper bound on the clustering error.

In some embodiments, variations are considered with respect to convolutional layer versus fully-connected (1×1 convolution). If splitting is required among the convolutional layers (even fully convolutional layers, such as in the case of semantic segmentation), then instead of changing the linear size of the layer (fc in this case), the depth of dimension may be changed to reflect the number of classes (this is the extension to FCN).

Further variations and embodiments may be produced using collapsing or adding or vertical layers per pathway, changing the size of layer as a function of label space, and/or extension to detection and RNN (unrolling in the same way by comparing confusions).

In yet another embodiment, techniques may be applied to identify when there may be too many layers in the network, such that fewer layers would be adequate for the required processing tasks. As noted above, one can reliably add depth to a network and see an improvement in performance given enough training data. However, this added boost in performance may come at a cost in terms of FLOPs and memory consumption. In some embodiments, the network is optimized with this tradeoff in mind with the usage of an all-or-nothing highway network, which learns whether or not a given layer of computation in the network is used via a binary decision. If a given computational block is used, a penalty is incurred. By varying this penalty term, one can customize the learning process with a target architecture in mind: an embedded system would prefer a much leaner architecture then a cloud-based system.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 4A-4F illustrate various embodiments of the invention.

DETAILED DESCRIPTION

Some embodiments of the invention are directed to an improved approach to implement structure learning for neural networks. The approach starts out with a network, provides the network with a problem having labeled data, and then reviews the structure of the output produced by this network. The network's architecture is then modified to obtain a better solution for the specific problem. Rather than having experts come up with highly complicated and domain-specific network architectures, this approach allows the data to drive the architecture of the network that will be used for a specific task.

Figure 1:
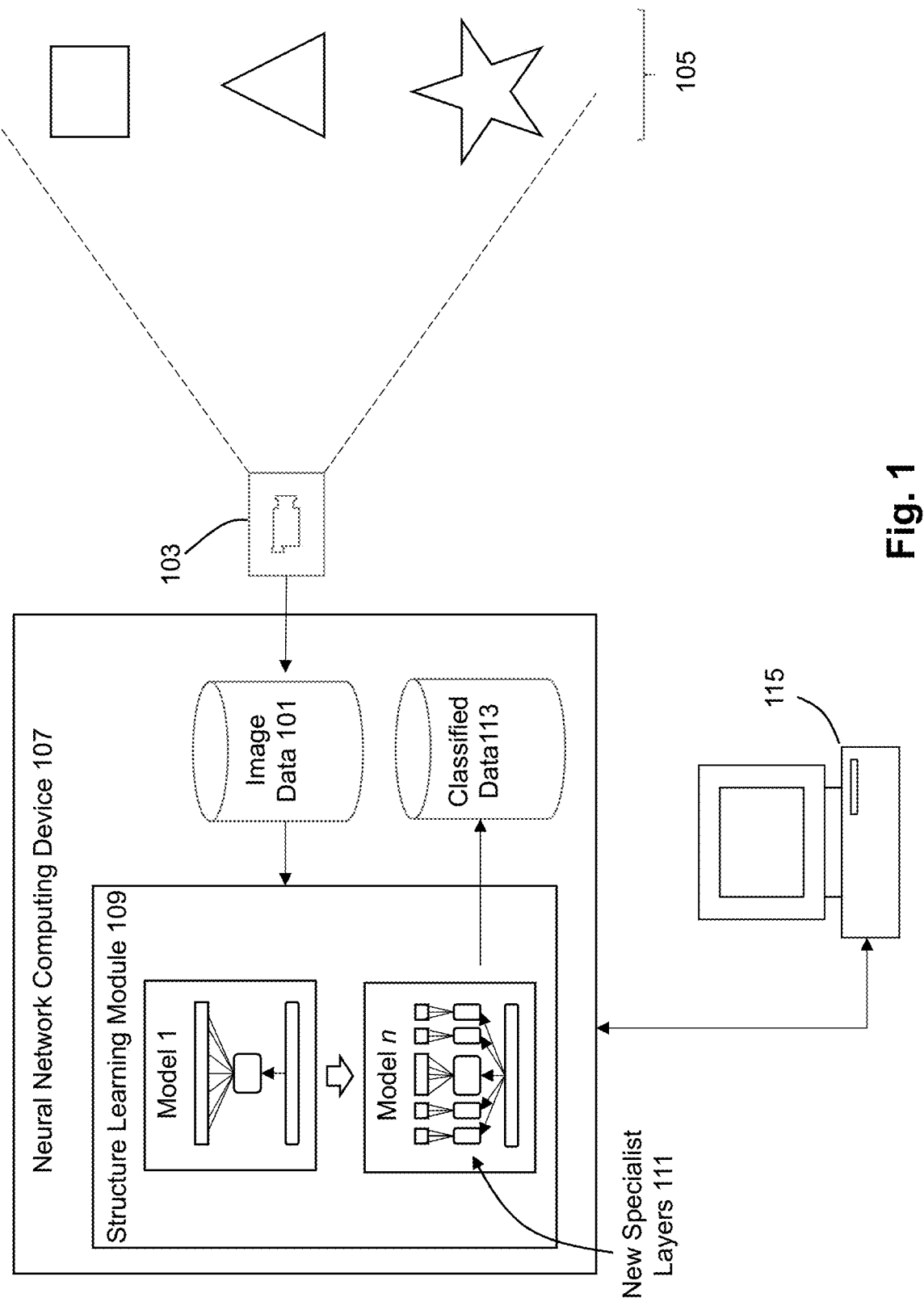
FIG. 1 illustrates an example system which may be employed in some embodiments of the invention to implement structure learning for neural networks.

FIG. 1 illustrates an example system which may be employed in some embodiments of the invention to implement structure learning for neural networks. The system may include one or more users that interface with and operate a computing system 107 or 115 to control and/or interact with the system. The system comprises any type of computing station that may be used to operate, interface with, or implement a neural network computing device 107 or user computing device 115. Examples of such computing systems include for example, servers, workstations, personal computers, or remote computing terminals connected to a networked or cloud-based computing platform. The computing system may comprise one or more input devices for the user to provide operational control over the activities of the system, such as a mouse or keyboard to manipulate a pointing object. The computing system may also be associated with a display device, such as a display monitor, for control interfaces and/or analysis results to users of the computing system.

In some embodiments, the system is employed to implement computer vision functionality. As such, the system may include one or more image capture devices, such as camera 103, to capture image data 101 for one or more objects 105 in the environment at which the system operates. The image data 101 and/or any analysis results (e.g., classification output data 113) may be stored in one or more computer readable storage mediums. The computer readable storage medium includes any combination of hardware and/or software that allows for ready access to the data that is located at the computer readable storage medium. For example, the computer readable storage medium could be implemented as computer memory and/or hard drive storage operatively managed by an operating system, and/or remote storage in a networked storage device, such as networked attached storage (NAS), storage area network (SAN), or cloud storage. The computer readable storage medium could also be implemented as an electronic database system having storage on persistent and/or non-persistent storage.

The neural network computing device 107 includes a structure learning module 109 to modify an original model 1 into an improved model n, where model n is the results of possibly multiple iterative processes to modify the layers within the model. The model n preferably includes a depth and breadth in knowledge, essentially a mixture of experts. The model should understand the difference between coarse categories, yet at the same time understands the difference for fine grained classes across various domains. New specialist layers 111 are added to the model as necessary to implement these goals. The design of such a system is governed by the constraint of adding resources solely where they are required. Simply expanding the network by making it arbitrarily deeper and wider does not scale due to computational constraints and thus the present approach avoids the need for extra regularization tricks.

Figure 2:
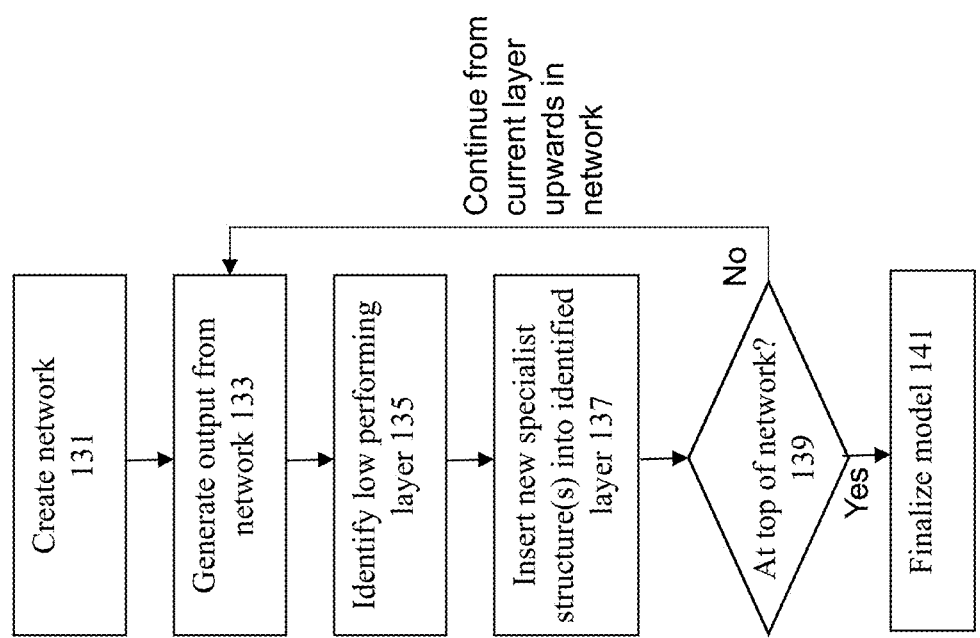
FIG. 2 shows a flowchart of an approach to implement structure learning for neural networks according to some embodiments of the invention.

FIG. 2 shows a flowchart of an approach to implement structure learning for neural networks according to some embodiments of the invention. The present approach implements structure learning of neural networks by exploiting correlations in the data/problem the networks aim to solve. A greedy approach is described that finds bottlenecks of information gain from the bottom convolutional layers all the way to the fully connected layers. Rather than simply making the architecture deeper arbitrarily, additional computation and capacitance is only added where it is required.

At 131, a network is created at an initial point in time. Any suitable approach can be used to create the network. For example, conventional Alexnet or Googlenet approaches may be used to generate the network.

Next, at 133, a set of outputs are generated from the network when applied to a designated task, e.g., to perform image recognition/object classification tasks. For example, assume that a number of people and animals are within an environment, and the assigned task is to analyze the image data to classify the different people and types of animals that can be observed within the environment. Each layer of the model provides certain outputs for the activities performed within that layer. The output has certain structures to it which can be reviewed to ascertain relationships between classes in the classification problem being solved.

At 135, the various layers within the network model are analyzed to identify the lowest performing layer within the model. For example, assume a model having ten layers, where the layers from layers 1 through 3 and layers 5 through 10 each provide a 10% improvement in classification accuracy, but layer 4 only provides a 1% improvement. In this situation, layer 4 would be identified as the lowest performing layer.

Next, at 137, additional structures are injected into the model to improve the performance of the model. In particular, new specialist layers are inserted into the model at the identified vertical position to augment the performance of the model.

Figure 4B:
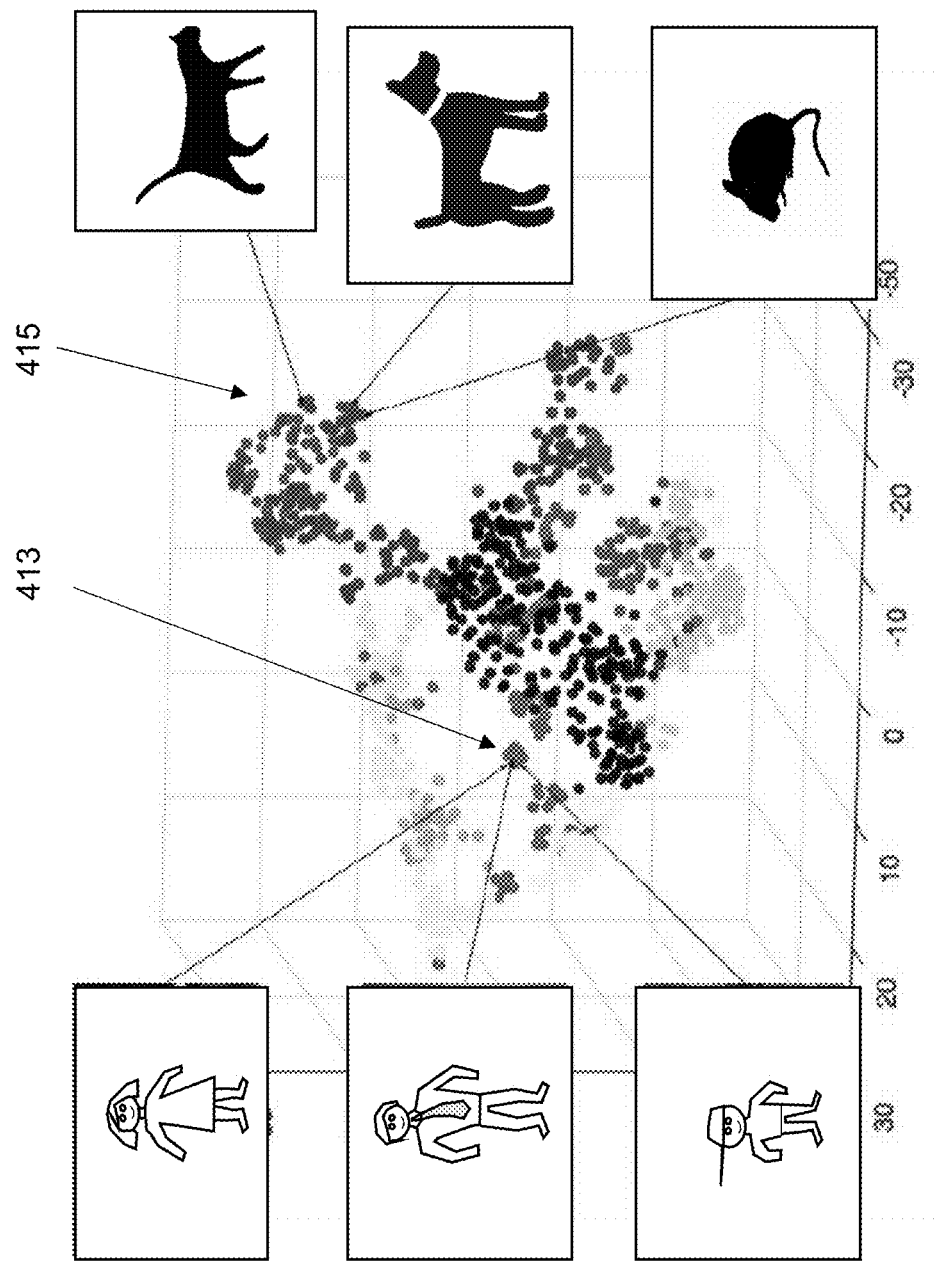

To explain this aspect of the inventive embodiment, assume that the model is intended to perform classifications of the people and animals in the environment as illustrated in FIG. 4A. Here, the image capture device captures images of different people (e.g., a woman 401, a man 403, and a child 405). In addition, the environment includes multiple animals (e.g., a cat 407, a dog 409, and a mouse 411). Further assume that the existing model is able to successfully distinguish the people (401, 403, 405) from the animals (407, 409, 411), but appears to have a more difficult time distinguishing the different people from each other or distinguishing the different types of animals from one another. If one reviews the actual structure that can be learned from a network (e.g., an Oracle network), it is clear that the network includes learning dependence between the predictions that is being made. However, in traditional deep-learning architecture design, this is not utilized. If one looks even closer at this structure, it is evident that the system is learning concepts that are actually visually similar to one another. Referring to FIG. 4B, an example scatter plot in 3D of classes is shown to illustrate an example structure of predictions for a fully-trained AlexNet, clustered into multiple groups. The distance between points corresponds to the visual similarity between concepts. Here, it can be seen that there is a first tight clustering of the points relative to the people objects and a second tight clustering of points relative to the animal objects. It is this phenomena that may contributes to difficulties in a model being able to distinguish one person from another or one animal from another.

In this situation in some embodiments of the invention, rather than just having one general purpose pathway to perform classification for all of these types of objects, a first new specialist layer may be added just to address classification of people and a second new specialist layer may be added just to address classification of animals. One specialist (people specialist layer) would therefore be assigned to handle data for portion 413 of the chart in FIG. 4B while the second specialist (animal specialist layer) would be assigned to handle data for portion 415 in FIG. 4B. By taking this action, over time, each of these specialist components becomes highly knowledgeable about its dedicated area of expertise, since the specialist is forced to learn extensive levels of detail about the specific subdomain assigned to that specialist component. In this way, the model is improved by adding new layers that will directly address areas of classification that have been specifically identified as being sub-optimal compared to other parts of the network.

This same process continues through the rest of the model to identify any additional layers that should be modified and/or augmented. Therefore, a determination is made at 139 whether the processing has reached the top of the network. If so, then the model is finalized at 141. If not, then the process returns back to 133 to continue the process until the top of the network is reached.

This approach can be taken to modify and improve the architecture of any off-the-shelf convolutional neural network. By following the inventive approach of the present disclosure, any neural network can be improved by (a) identifying the information gain bottleneck in its structure, (b) applying the structure of the predictions to alleviate the bottleneck, and finally (c) determining the depth of specialists pathways.

Figure 3:
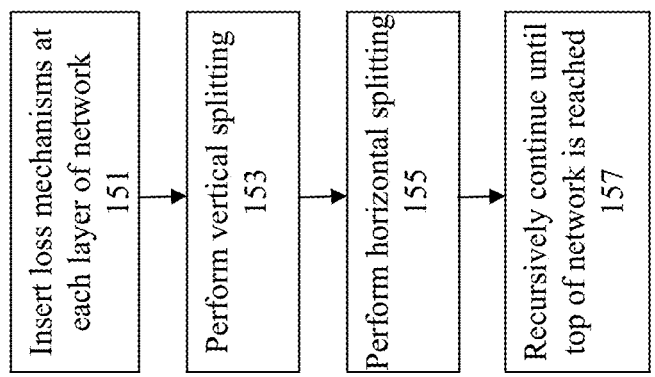
FIG. 3 illustrates a more detailed flowchart of an approach to implement structure learning for neural networks according to some embodiments.

FIG. 3 illustrates a more detailed flowchart of an approach to implement structure learning for neural networks according to some embodiments. For the purposes of this flow, assume that a network (e.g., a monolithic network) has already been created pursuant to any suitable approach such as Alexnet or Googlenet.

Figure 4C:
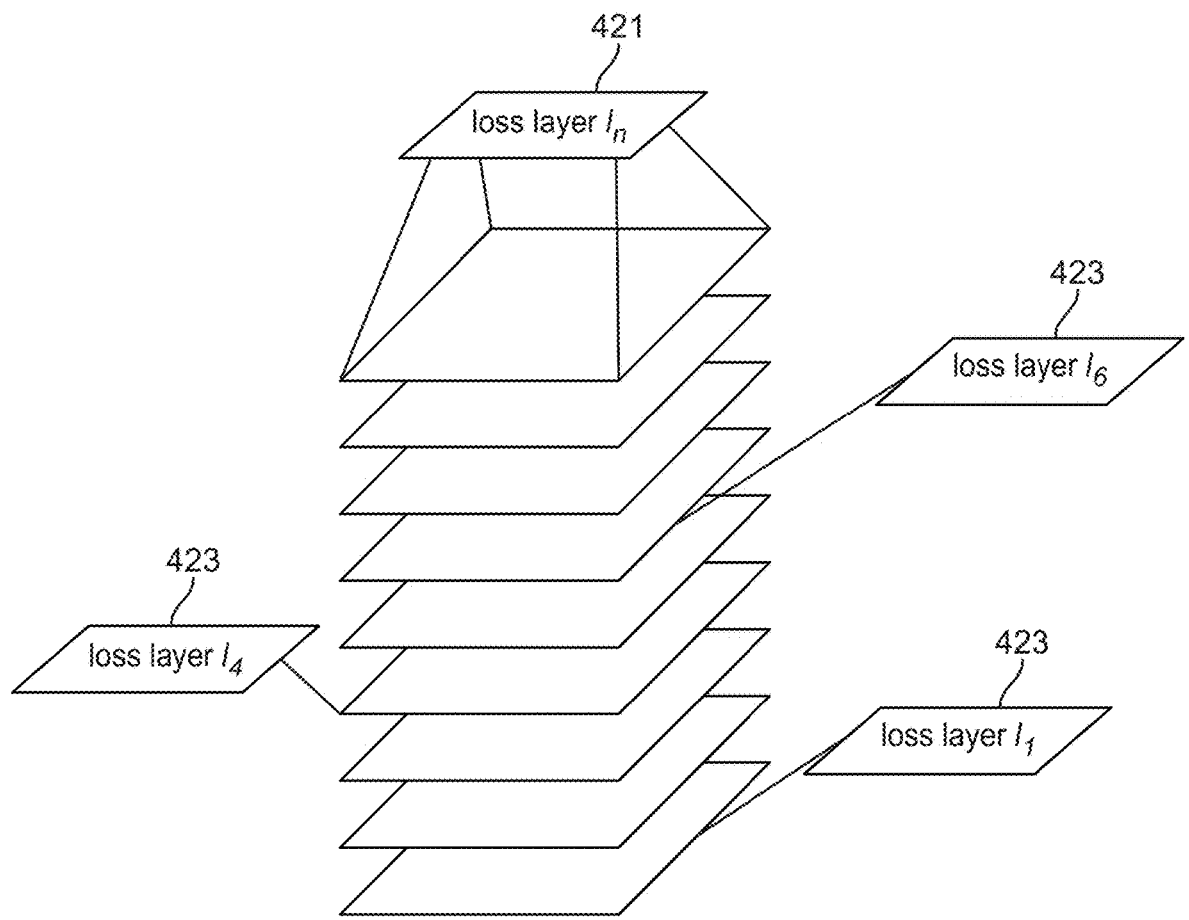

At 151, a "loss" mechanism (e.g., a loss layer, a loss function, and/or cost function) is included at each layer of the network. A loss mechanism corresponds to a function that maps an event or value to a representation of a cost or error value associated with processing within the neural network. As shown in FIG. 4C, instead of just having a single top-level loss layer 421, additional loss layers 423 are added to the other layer within the network. Therefore, this figure shows an example of a deep neural network with multiple loss layers at intermediate, and final, stages of feature extraction, where each loss layer measures the performance of the network up to that point in depth. Recall that the goal is to augment and modify the network architecture to solve a given problem as best as possible by modifying its architecture to best fit the task. Therefore, the approach analyzes the predictions, formed at the various loss layers throughout the network, and groups neuron activations based on the confusion between them.

Figure 4D:
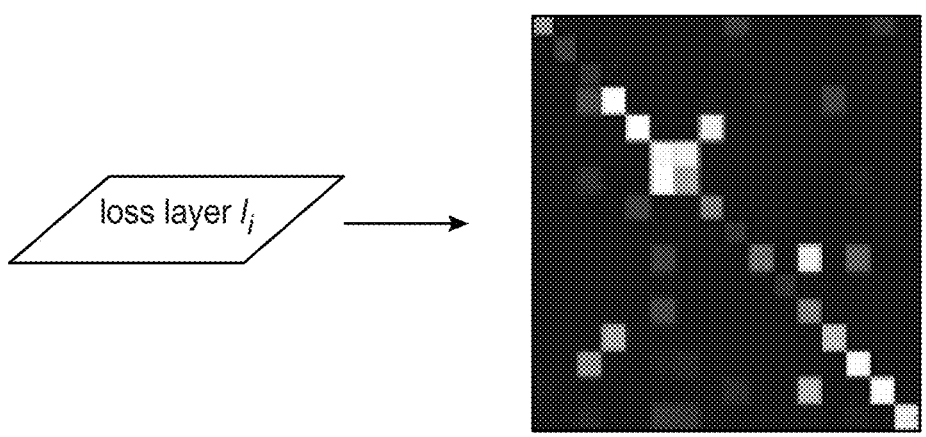
Figure 4E:
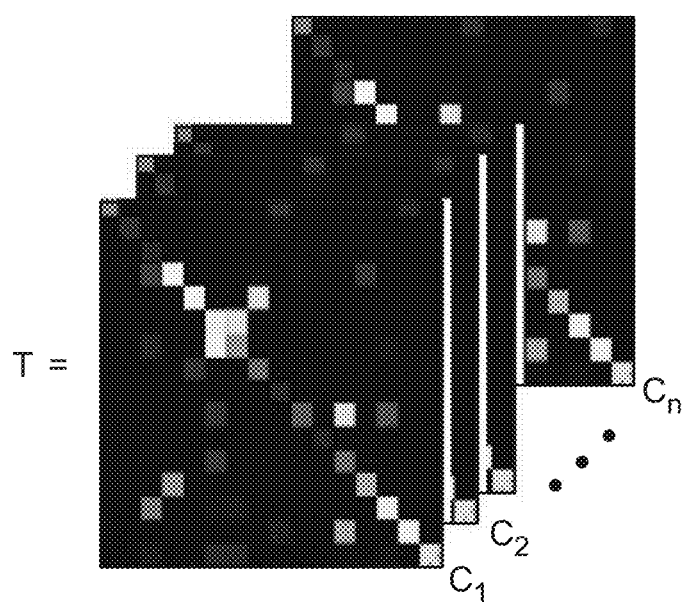

As illustrated in FIGS. 4D and 4E, predictions generated at each loss layer and converted to the respective confusion matrices (as shown in FIG. 4D), forming a tensor T containing all confusion matrices for the network, e.g., Oracle network (as shown in FIG. 4E). By analyzing the structure of T and its elements, the aim is to modify and augment the existing structure of the network both in terms of depth and breadth.

To explain, let Ci be the confusion matrix of classes and loss layer i, then:

$$A_i = C_i C_i^T \tag{1}$$

$$D(i, i) = \sum_{i=1}^{l} A(i, :) \tag{2}$$

$$L_i = D_i^{-1/2} A_i D_i^{1/2} \tag{3}$$

$$\hat{C}_i = top_{N_E}(eig(L_i)), \tag{4}$$

where $A_i$ is the affinity matrix at loss layer i, $D_i$ is the diagonal matrix, $L_i$ is the graph Laplacian, and $\hat{C}_i$ is a subspace spanned by the leading eigenvectors of the graph Laplacian of the affinity matrix produced by $C_i$. Consequently, tensor:

$$\hat{T}=[\hat{C}_1, \hat{C}_2, \hat{C}_3, \ldots, \hat{C}_n].$$

To maximize feature sharing and reduce computation on one hand, yet to increase accuracy on the other, the aim is to restructure the existing networks' structure. To do so, the approach partitions the networks' depth as well and breadth according its current performance.

Therefore, at 153, vertical splitting is performed, e.g., by computing the dot product between the different layers. To partition the architecture in depth, some embodiments compare the neighboring subspaces that correspond to the consecutive loss function evaluations at neighboring layers using the following equation:

$$\Phi(i, i+1) = 1 - \frac{1}{N_E} \|\hat{C}_{i+1}^T \hat{C}_i\|_F^2. \tag{5}$$

Here, $\hat{C}_i$ and $\hat{C}_{i-1}$ denote the approximate leading eigenvectors of the confusion matrices for loss functions at levels i and i+1, and F denotes the Frobenius norm. Formally, $\hat{C}_i$ and $\hat{C}_{i+1}$ represent $N_E$-dimensional subspaces and $\Phi$ (i, i+1) is the normalized complement angle between them. It is important to note that this measure $\Phi$ only depends on the subspace spanned by the columns of $\hat{C}_i$ and $\hat{C}_{i+1}$ and thus is invariant to rotations of the eigenvectors. Also, $\Phi$ is constrained within [0, 1], with levels i and i+1 are deemed similar in structure if $\Phi(i, i+1)$ is close to zero and is exactly 1 when $\Phi(i, i+1)$ are orthogonal. To construct a complete similarity relation between levels of scale space, all neighboring pairs of losses layers are compared using $\Phi$. With the established similarity relations it is now possible to address the problem of partitioning the monolithic network architecture.

Let $\phi$ be the vector of all sequential pairs of i and i+1, where $\phi_i = \Phi(i, i+1)$. Values of $\phi_i$ closest to zero indicate the lowest information gain between layers i and i+1. Thus, argmin($\phi$) is the optimal initial split of the monolithic architecture. Splitting the architecture in depth facilitates feature sharing while identifying points of redundancy (zero information gain).

At 155, horizontal splitting is performed, e.g., by performing K-way Bifurcation. To improve the performance of the network at a particular layer, its structure (e.g., fully convolutional), may require augmentation. Parts of the network focus on general knowledge (generalist), while others concentrate on a small subset of labels that have high similarity among each other (specialist). Knowledge achieved by layer i will be used to perform the first horizontal partitioning of the network.

Figure 4F:
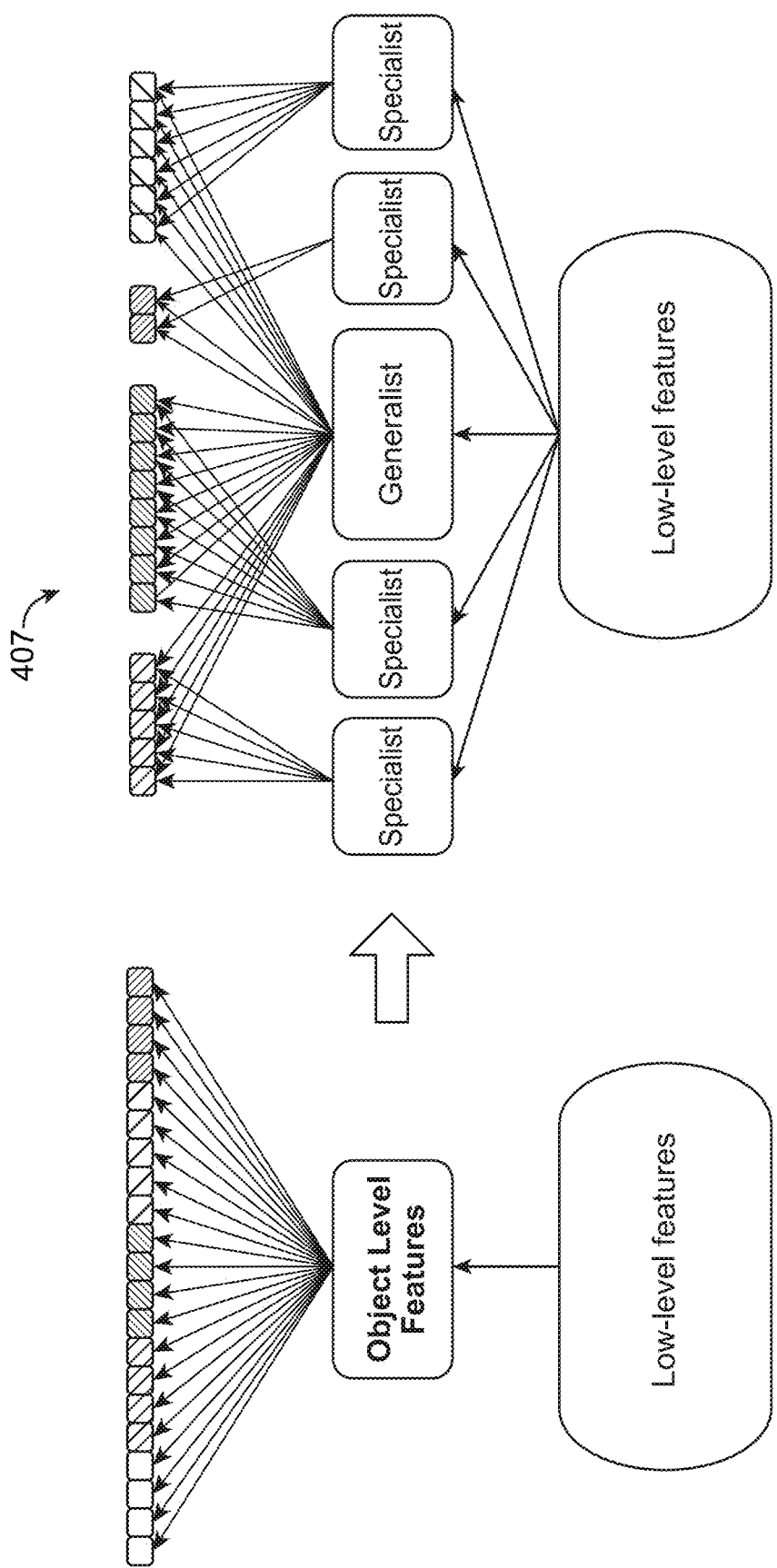

Formally, given $C_i$, compute $L_i$ as per Equations (1), (2), and (3) as disclosed above. An Eigengap is determined by analyzing the leading eigenvalues of the graph Laplacian $L_i$ to determine the number of new pathways (specialists). Original data is projected onto the top N leading eigengectors of $L_i$; in $R^N$, the data is further clustered into k classes, where k equals the Eigengap. An example of such projection and grouping is illustrated in FIG. 4B. This procedure will lead to the modification of the architecture as shown in FIG. 4F, which illustrates a network 407 after the first split.

Once the first split has been established, then all new pathways are treated as the original network. The splitting procedure are applied until no more labels are left to split or 100% accuracy is achieved.

At 157, the above processing continues (e.g., in a recursive manner) until the top of the network is reached. At this point, the final model is stored into a computer readable medium.

This portion of the disclosure pertains to the deep learning of the specialists. While the structure of the generalist is known to perform well on general knowledge, it is not guaranteed that this same structure will perform well in a specialist where the task of the specialist may require a more simple or complex representation. Some embodiments allow the structure of each specialist to deviate from the structure of the generalist via depth-wise splitting, in a data-driven manner.

Let $L = \{L_1, L_2, \ldots, L_n\}$ be a set of fully-connected layers to be considered for further splitting. Consider a layer $L_i$ in L that produces an output y. One can write the transformation that it applies to its input as $y = \sigma(f(x))$, where $\sigma(\ )$ applies a non-linearity such as ReLU and $f(x) = Wx$ where W is a learned weight matrix of dimensions M×N and x is input to this layer having dimensions N×1. To perform a split, the approach decomposes the transformation of $L_i$ into $y = \sigma_1(g(\sigma_2(h(x))))$, where $\sigma_1(\ )$ and $\sigma_2(\ )$ are activation functions and $g(x) = W_1 x$ and $h(x) = W_2 x$ in which $W_1$ has dimensions N×N and $W_2$ has dimensions M×N. The approach chooses:

$$\sigma_1(x) = \sigma(x) \quad (6)$$

$$g(x) = U\sqrt{\Sigma} x \quad (7)$$

$$\sigma_2(x) = Ix \quad (8)$$

$$h(x) = \sqrt{\Sigma} V^T x \quad (9)$$

Here, $W = U\Sigma V^T$ is the SVD factorization of W and I is the identity matrix. With this change, the transformation of layer $L_i$ is unchanged. To increase the complexity of the learned representation of $L_i$ one could set $\sigma_2$ as a non-linear activation function, such as ReLU. However, adding this non-linearity causes an abrupt change in the learned representation of $L_i$ and may cause the network to restart much of its learning from scratch. Instead, one can insert a PReLU non-linearity and initialize its single parameter a to be 1, which is equivalent to I in equation 8. This provides the specialist with a smooth mechanism for introducing a new non-linearity at this layer.

Given the set of layers L, one can apply the above strategy to each layer $L_i$ independently and greedily choose the split which provides the best improvement on the training loss. This process can be repeated recursively to our the set of layers $L_{new} = \{L_1, L_2, \ldots, L_n, L_{n-1}\}$.

Additional variations of these techniques may be applied in alternate embodiments. For example, for every pair of splits (vertical or horizontal), a network can be retrained to get classification at a given pathway. Techniques can be applied in certain embodiments for speeding this up and/or avoiding it at all, such as by agglomerative clustering and/or splitting. Further, given confusion matrix $C_i$, and its partitioning K, agglomerative clustering may be performed on each of the K parts of the $C_i$ to estimate further splits. This leads to the cost $X_u$. Cost $X_s$ is the cost of supervised grouping, learning new confusion matrices at high levels of the network. $X_u$ is less than or equal to $X_s$+Tau, where Tau is the upper bound on the clustering error.

In some embodiments, variations are considered with respect to convolutional layer versus fully-connected (1×1 convolution). If splitting is required among the convolutional layers (even fully convolutional layers, such as in the case of semantic segmentation), then instead of changing the linear size of the layer (fc in this case), the depth of dimension may be changed to reflect the number of classes (this is the extension to FCN).

Further variations and embodiments may be produced using collapsing or adding or vertical layers per pathway, changing the size of layer as a function of label space, and/or extension to detection and RNN (unrolling in the same way by comparing confusions).

In yet another embodiment, techniques may be applied to identify when there may be too many layers in the network, such that fewer layers would be adequate for the required processing tasks. As noted above, one can reliably add depth to a network and see an improvement in performance given enough training data. However, this added boost in performance may come at a cost in terms of FLOPs and memory consumption. In some embodiments, the network is optimized with this tradeoff in mind with the usage of an all-or-nothing highway network, which learns whether or not a given layer of computation in the network is used via a binary decision. If a given computational block is used, a penalty is incurred. By varying this penalty term, one can customize the learning process with a target architecture in mind: an embedded system would prefer a much leaner architecture then a cloud-based system.

The issue addressed by this embodiment is to determine how deep a network should be given a computational budget for a given problem X. With the approach of using an all-or-nothing highway network, highway networks introduce a mixing matrix to learn how the skip connection from the previous layer should be transformed before mixing with the output of the current computational block. Consider the following equation:

$$y = F(x, W_i) + W_s x \quad (10)$$

Residual networks can find success in using the identity mapping to combine the skip connection. Although the identity mapping is less representative, it is more efficient and easier to optimize:

$$y = F(x, W_i) + x \tag{11}$$

The current approach instead parameterize a mixing matrix by a single scalar which gates the output of the computational block (see FIG. 5A):

$$y = \alpha F(x, W_i) + x \tag{12}$$

When $\alpha=0$, the $y=x$ and the input is simply passed to the output. When $\alpha=1$, (eqn 12) becomes (eqn 10) and a residual unit is used for computation.

Figure 5A:
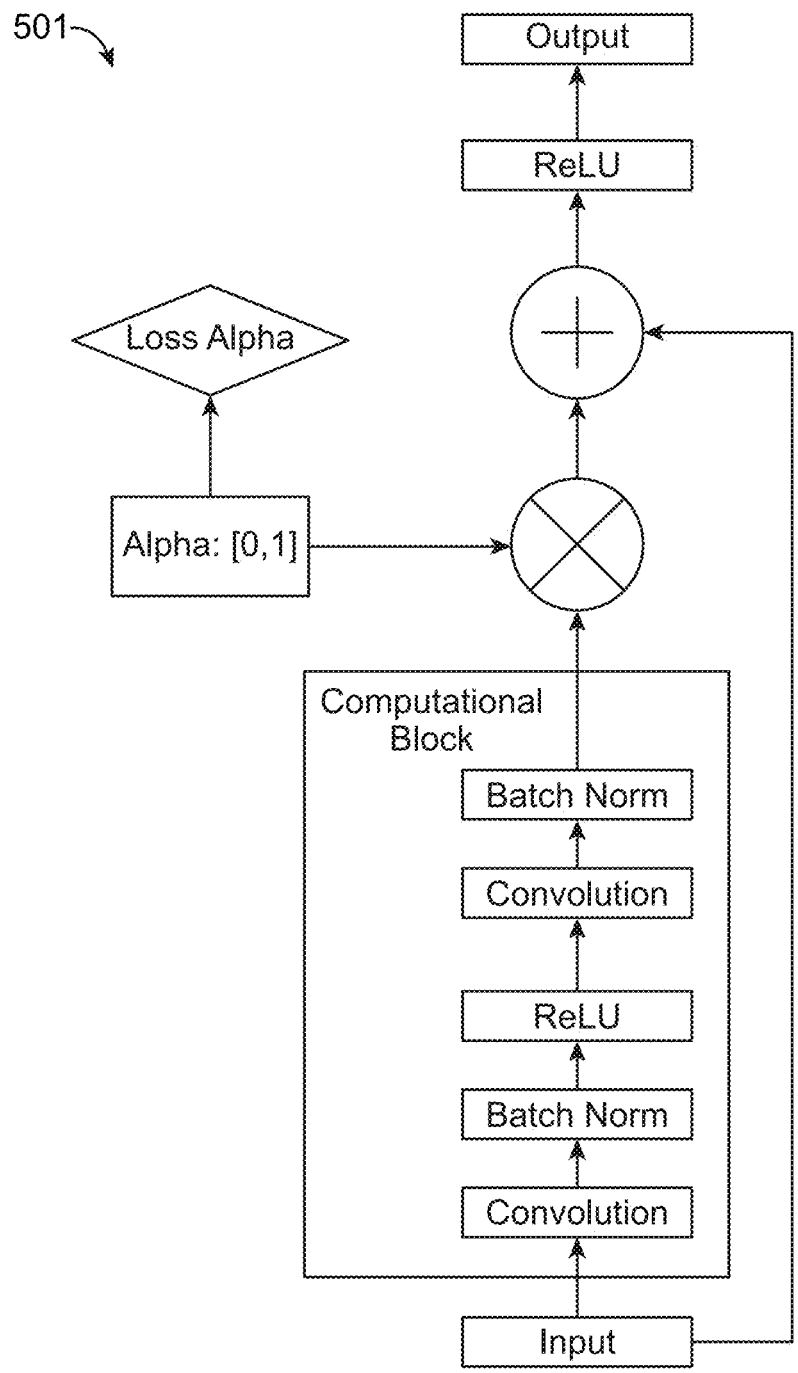
FIGS. 5A-5B illustrate an approach to identify when there may be too many layers in the network.

FIG. 5A illustrates a chart 501 for a network with an all-or-nothing highway connection. In this figure, a computational block is fed an input and later joined via a residual connection (elementwise addition). Before the addition, the output of the computation block is scaled by a learned parameter $\alpha$ which penalizes the use of this computational block. This loss is described below.

Learning is performed to determine whether or not to use a computation block. It is desirable to impose a prior on the $\alpha$ parameter which controls the behavior of a given layer in a deep network, and optimize this parameter jointly with the model parameters and its objective function. During training, it is desirable to encourage a binary decision for $\alpha$ to choosing either 0 or 1 for each depth independently. If a computational block is learned to be skipped, then one can simply remove that computation block from the model at inference time.

In a residual network, consecutive layers in general have small mappings, where the learned residual functions in general have small responses, suggesting that identity mappings provide reasonable preconditioning. This suggests that transitioning between an identity map in (eqn 10) and an identity layer and vice versa should not cause catastrophic change in the objective function. Thus the present approach introduces a piecewise smooth loss function on the $\alpha$ parameter which gates the output of the computational block at various depths.

In addition, it is desirable to parameterize the loss function on the $\alpha$ parameters such that for a different scenarios, a higher penalty is assigned to models which use more computation. In the case a light embedded platform such as smartphone, one might want a high penalty for choosing a layer. In the case of a cloud computing platform, no such penalty for using a computation block might be wanted. Given these criteria, one can use the piecewise smooth polynomial/linear function shown in FIG. 5B, which can be parameterized by the following:

```
if x < 0.:
    y = (np.absolute(x) * self.steepness)
elif x > 1.:
    y = (x - 1.) * self.steepness ++ self.peak*0.125
elif x < 0.5:
    y = -self.peak * (x**2. - x)
else:
    y = -self.peak/2. * (x**2. - x) + self.peak*0.125
```

Figure 5B:
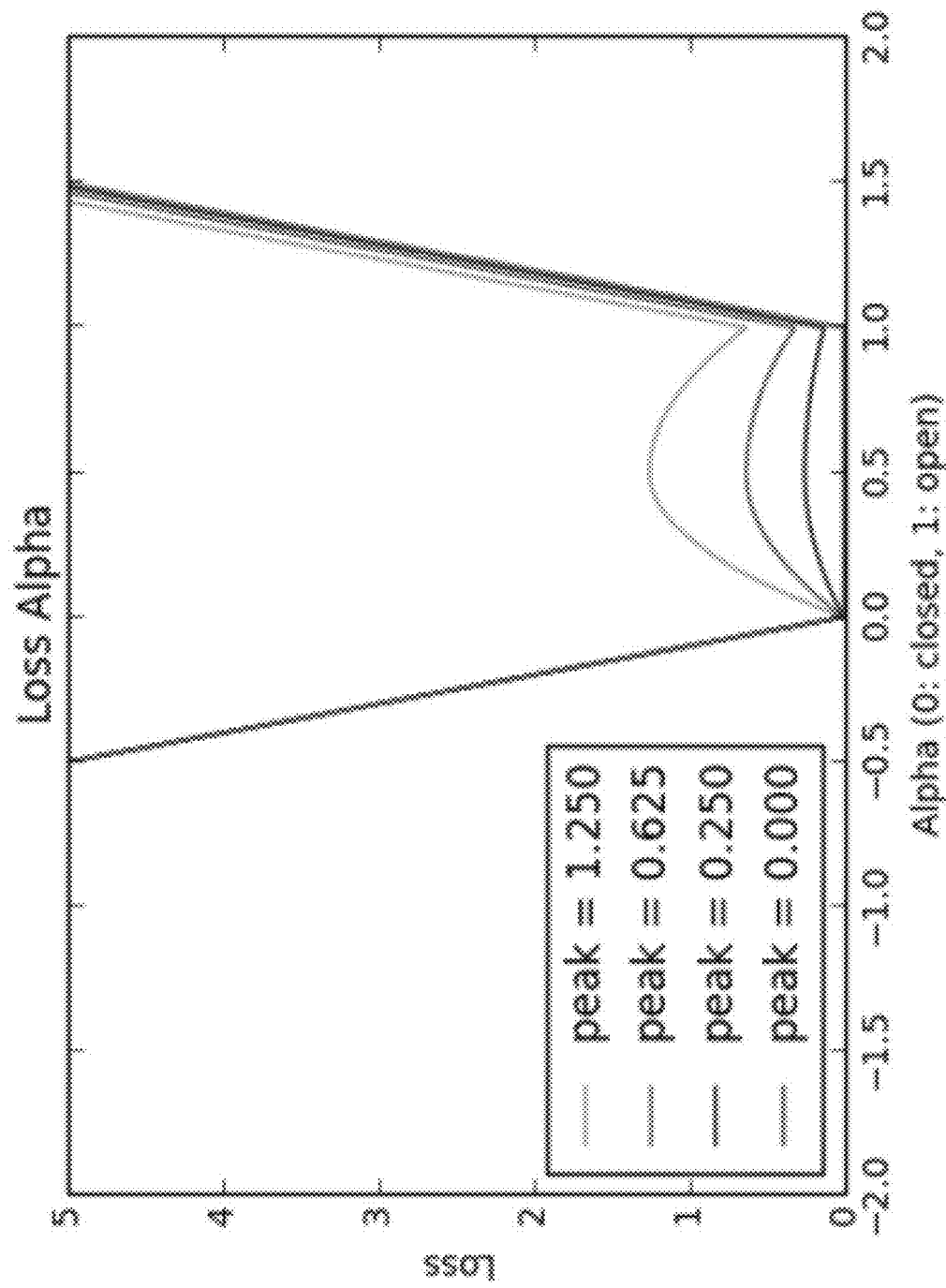

For various selections of the peak shown in FIG. 5B, a varying usage penalty is given to the model.

Agumented Reality and Computing Systems Architecture(s)

The above-described techniques are particularly applicable to machine vision applications for virtual reality and augmented reality systems. Various embodiments of augmented reality display systems have been discussed in co-owned U.S. Utility patent application Ser. No. 14/555,585 filed on Nov. 27, 2014, entitled "VIRTUAL AND AUGMENTED REALITY SYSTEMS AND METHODS," and co-owned U.S. Prov. Patent Application Ser. No. 62/005,834 filed on May 30, 2014, entitled "METHODS AND SYSTEM FOR CREATING FOCAL PLANES IN VIRTUAL AND AUGMENTED REALITY," the contents of the aforementioned U.S. patent applications are hereby expressly and fully incorporated herein by reference as though set forth in full. The inventive neural network classification device may be implemented independently of AR systems, but many embodiments below are described in relation to AR systems for illustrative purposes only.

Disclosed are devices, methods and systems for classification and recognition for various computer systems. In one embodiment, the computer system may be a head-mounted system configured to facilitate user interaction with various other computer systems (e.g., financial computer systems). In other embodiments, the computer system may be a stationary device (e.g., a merchant terminal or an ATM) configured to facilitate user financial transactions. Various embodiments will be described below in the context of an AR system (e.g., head-mounted), but it should be appreciated that the embodiments disclosed herein may be used independently of any existing and/or known AR systems.

Referring now to FIGS. 6A-6D, some general AR system component options are illustrated according to various embodiments. It should be appreciated that although the embodiments of FIGS. 6A-6D illustrate head-mounted displays, the same components may be incorporated in stationary computer systems as well, and FIGS. 6A-6D should not be seen as limiting.

Figure 6A:
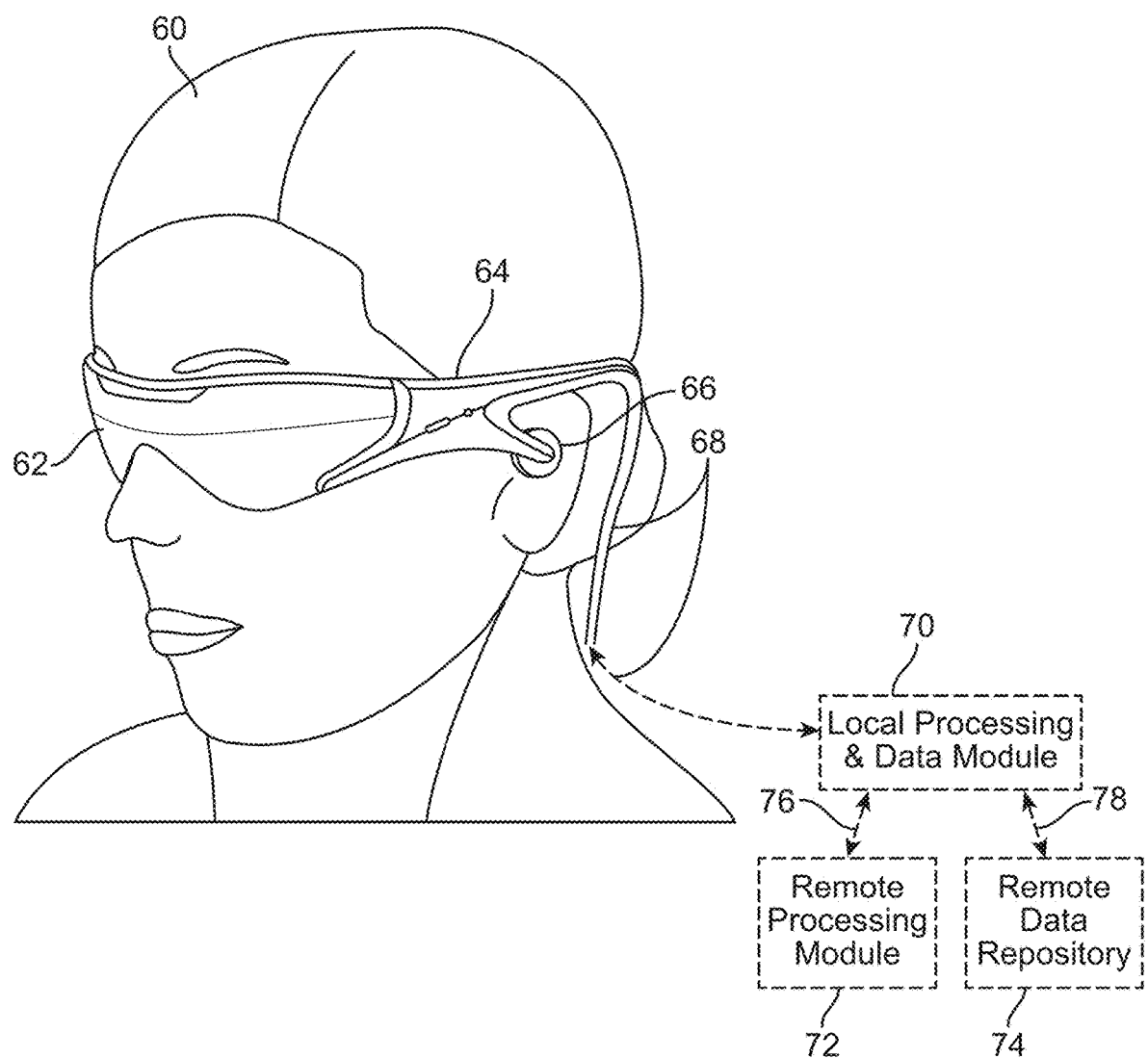
FIGS. 6A-6D illustrate general AR system component options for various embodiments.
Figure 6B:
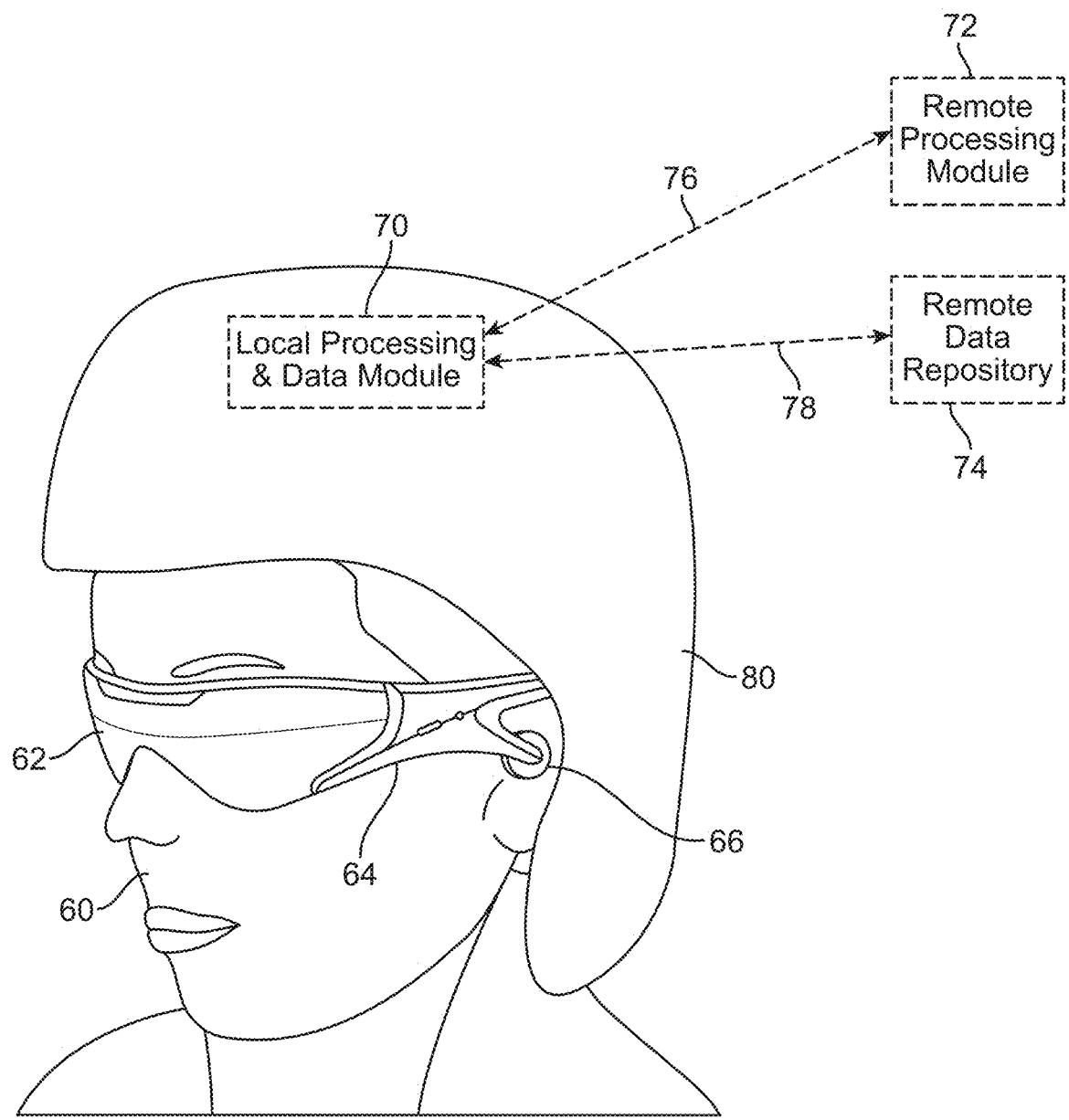
Figure 6C:
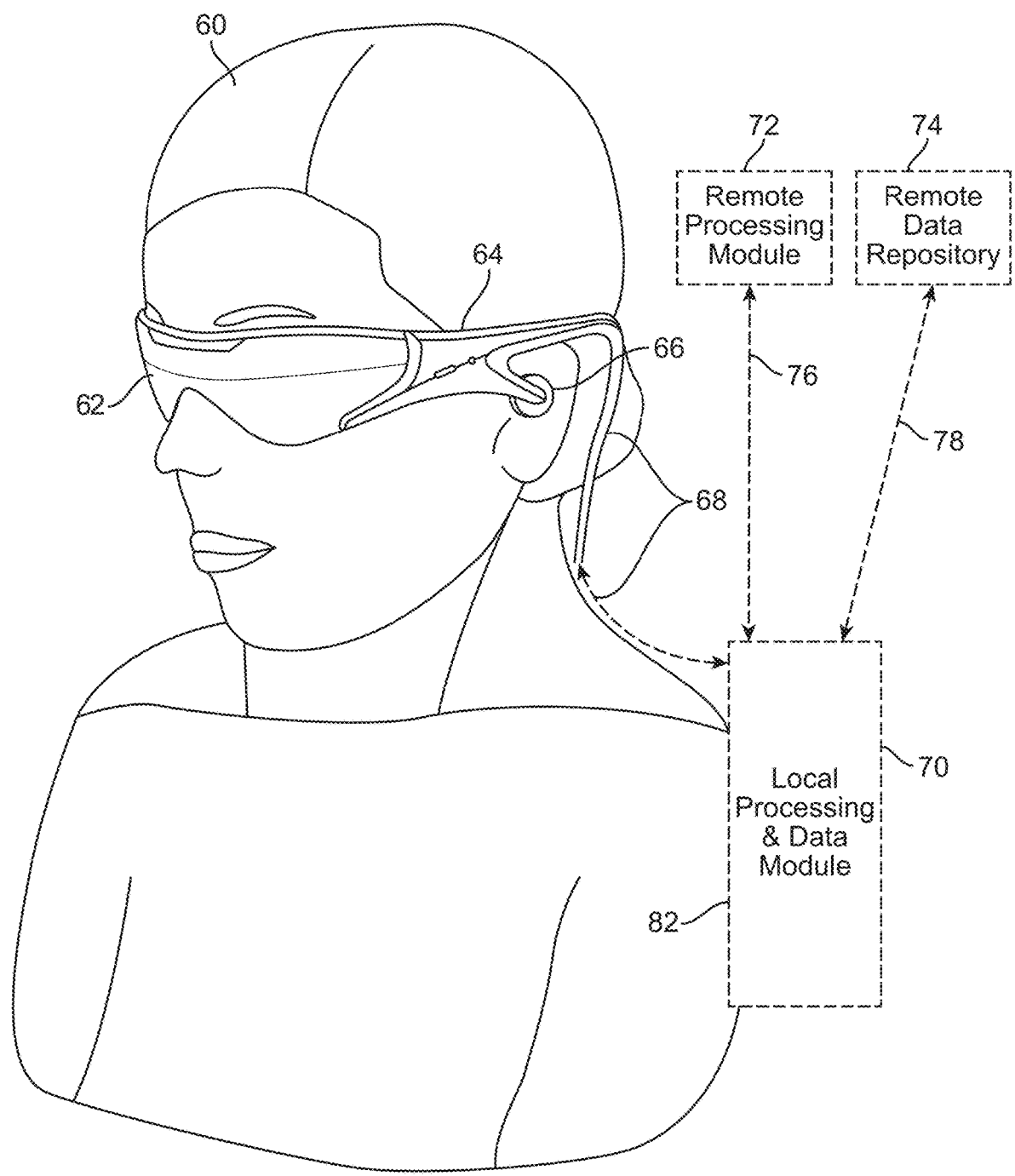
Figure 6D:
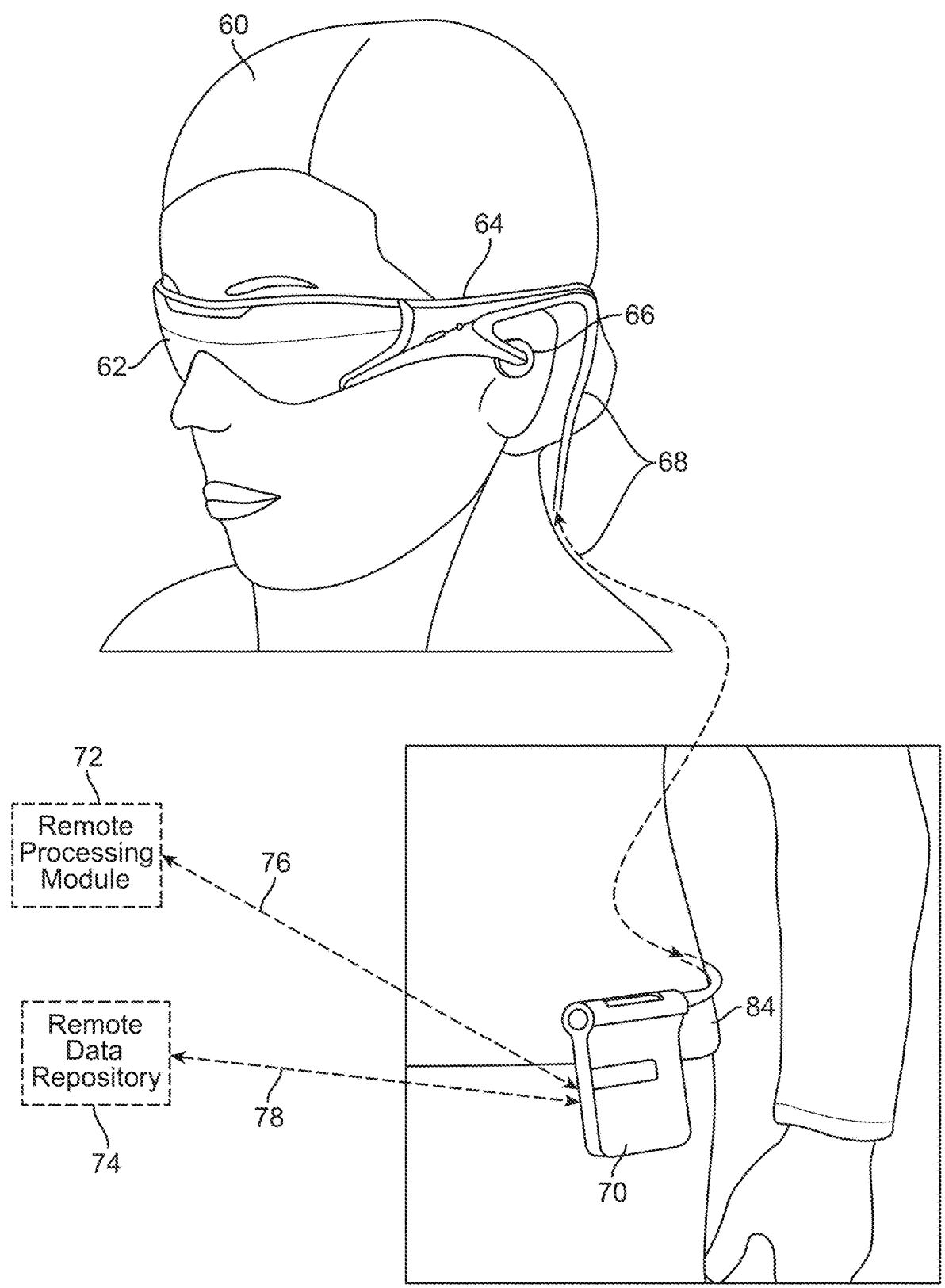

As shown in FIG. 6A, a head-mounted device user 60 is depicted wearing a frame 64 structure coupled to a display system 62 positioned in front of the eyes of the user 60. The frame 64 may be permanently or temporarily coupled to one or more user identification specific sub systems depending on the required level of security. A speaker 66 may be coupled to the frame 64 in the depicted configuration and positioned adjacent the ear canal of the user 60. In an alternative embodiment, another speaker (not shown) is positioned adjacent the other ear canal of the user 60 to provide for stereo/shapeable sound control. In one or more embodiments, the user identification device may have a display 62 that is operatively coupled, such as by a wired lead or wireless connectivity, to a local processing and data module 70, which may be mounted in a variety of configurations, such as fixedly attached to the frame 64, fixedly attached to a helmet or hat 80 as shown in the embodiment depicted in FIG. 6B, embedded in headphones, removably attached to the torso 82 of the user 60 in a backpack-style configuration as shown in the embodiment of FIG. 6C, or removably attached to the hip 84 of the user 60 in a belt-coupling style configuration as shown in the embodiment of FIG. 6D.

The local processing and data module 70 may comprise a power-efficient processor or controller, as well as digital memory, such as flash memory, both of which may be utilized to assist in the processing, caching, and storage of data. The data may be captured from sensors which may be operatively coupled to the frame 64, such as image capture devices (such as cameras), microphones, inertial measurement units, accelerometers, compasses, GPS units, radio devices, and/or gyros. Alternatively or additionally, the data may be acquired and/or processed using the remote processing module 72 and/or remote data repository 74, possibly for passage to the display 62 after such processing or retrieval. The local processing and data module 70 may be operatively coupled 76, 78, such as via a wired or wireless communication links, to the remote processing module 72 and the remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

In some embodiments, identification devices (or AR systems having identification applications) similar to those described in FIGS. 6A-6D provide unique access to a user's eyes. Given that the identification/AR device interacts crucially with the user's eye to allow the user to perceive 3-D virtual content, and in many embodiments, tracks various biometrics related to the user's eyes (e.g., iris patterns, eye vergence, eye motion, patterns of cones and rods, patterns of eye movements, etc.), the resultant tracked data may be advantageously used in identification applications. Thus, this unprecedented access to the user's eyes naturally lends itself to various identification applications.

Figure 7:
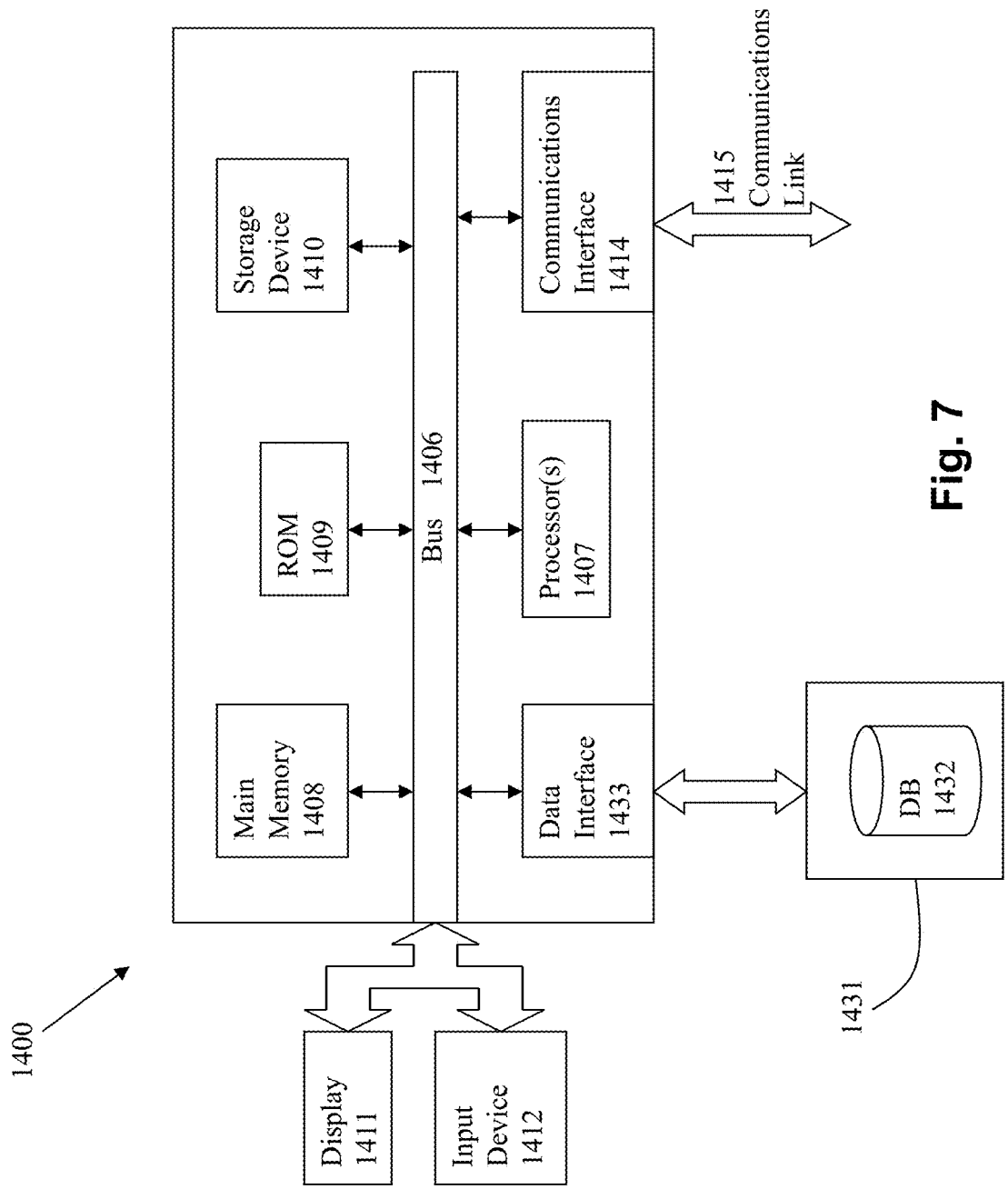
FIG. 7 depicts a computerized system on which some embodiments of the invention can be implemented

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
   creating a neural network comprising a plurality of layers;
   the neural network performing a processing task to generate and output;
   identifying an extraneous layer from the plurality of layers;
   removing the extraneous layer from the neural network; and
   identifying and removing other extraneous layers from the plurality of layers until no other extraneous layer is identified,
   wherein the neural network undergoes both vertical splitting and horizontal splitting.

2. The method of claim 1, wherein identifying the extraneous layer comprises determining that the extraneous layer does not improve the performance of the processing task by the neural network.

3. The method of claim 1, wherein an all-or-nothing highway network is employed to identify the extraneous layer in the neural network to be removed.

4. The method of claim 3, further comprising associating a penalty with use of the extraneous layer.

5. The method of claim 4, wherein a size of the penalty corresponds to an amount of computational power used by the extraneous layer.

6. The method of claim 5, wherein a size of the penalty is varied.

7. A method implemented with a processor, comprising:
   creating a neural network comprising a plurality of layers;
   the neural network performing a processing task to generate and output;
   identifying an extraneous layer from the plurality of layers, wherein an all-or-nothing highway network is employed to identify the extraneous layer in the neural network to be removed;

removing the extraneous layer from the neural network;
identifying and removing other extraneous layers from the plurality of layers until no other extraneous layer is identified; and
associating a penalty with use of the extraneous layer, wherein the penalty is set to 0 when the processor is part of a cloud computing platform.

8. The method of claim 3, wherein the all-or-nothing highway network generates a binary decision to not use the extraneous layer.

9. A method implemented with a processor, comprising:
creating a neural network comprising a plurality of layers;
the neural network performing a processing task to generate and output;
identifying an extraneous layer from the plurality of layers, wherein an all-or-nothing highway network is employed to identify the extraneous layer in the neural network to be removed;
removing the extraneous layer from the neural network;
identifying and removing other extraneous layers from the plurality of layers until no other extraneous layer is identified; and
the all-or-nothing highway network introducing a mixing matrix to determine how to transform a skip connection corresponding to the extraneous layer.

10. The method of claim 9, further comprising parameterizing the mixing matrix by a scalar value.

11. The method of claim 10, wherein when the scalar value is zero, an input to the extraneous layer is passed onto an output from the extraneous layer, thereby skipping the extraneous layer before removing the extraneous layer form the neural network.

12. The method of claim 3, further comprising using identity mapping to transform a skip connection corresponding to the extraneous layer.

13. The method of claim 1, further comprising updating a model for the neural network to obtain an updated model, wherein the extraneous layer is removed from the model to obtain the updated model.

14. The method of claim 1, wherein a plurality of loss layers are added to the neural network.

15. A method implemented with a processor, comprising:
creating a neural network comprising a plurality of layers;
the neural network performing a processing task to generate and output;
identifying an extraneous layer from the plurality of layers;
removing the extraneous layer from the neural network;
identifying and removing other extraneous layers from the plurality of layers until no other extraneous layer is identified;
adding a plurality of loss layers to the neural network; and
generating predictions at one of the loss layers, and converting the predictions to one or more confusion matrices forming a tensor T.

16. The method of claim 15, wherein a structure of T is analyzed to modify and augment an existing structure of the neural network both in terms of depth and breadth.

17. The method of claim 1, wherein K-way Bifurcation is performed to implement the horizontal splitting.

18. A method implemented with a processor, comprising:
creating a neural network comprising a plurality of layers;
the neural network performing a processing task to generate and output;
identifying an extraneous layer from the plurality of layers;
removing the extraneous layer from the neural network;
identifying and removing other extraneous layers from the plurality of layers until no other extraneous layer is identified,
wherein each layer of the neural network is addressed independently, and a given layer of the neural network undergoes splitting by performing a greedy choice to split the given layer which provides a best improvement on a training loss.

19. The method of claim 1, wherein the neural network is employed to classify images captured for a virtual realty or augmented reality system.

20. A system, comprising:
a processor;
a memory for holding programmable code; and
wherein the programmable code includes instructions for creating a neural network comprising a plurality of layers; the neural network performing a processing task to generate and output; identifying an extraneous layer from the plurality of layers; removing the extraneous layer from the neural network; and identifying and removing other extraneous layers from the plurality of layers until no other extraneous layer is identified,
wherein the neural network undergoes both vertical splitting and horizontal splitting.

21. A computer program product embodied on a non-transitory computer readable medium, the non-transitory computer readable medium having stored thereon a sequence of instructions which, when executed by a processor causes the processor to execute a method comprising:
creating a neural network comprising a plurality of layers;
the neural network performing a processing task to generate and output;
identifying an extraneous layer from the plurality of layers;
removing the extraneous layer from the neural network; and
identifying and removing other extraneous layers from the plurality of layers until no other extraneous layer is identified,
wherein the neural network undergoes both vertical splitting and horizontal splitting.

* * * * *